United States Patent
Yagi

(10) Patent No.: US 10,234,096 B2
(45) Date of Patent: Mar. 19, 2019

(54) VEHICLE LAMP

(71) Applicant: KOITO MANUFACTURING CO., LTD., Tokyo (JP)

(72) Inventor: Takayuki Yagi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 140 days.

(21) Appl. No.: 15/200,758

(22) Filed: Jul. 1, 2016

(65) Prior Publication Data

US 2017/0002991 A1 Jan. 5, 2017

(30) Foreign Application Priority Data

Jul. 2, 2015 (JP) ................................. 2015-133972

(51) Int. Cl.
*F21S 41/29* (2018.01)
*G02B 19/00* (2006.01)
*F21S 41/147* (2018.01)
*F21S 41/155* (2018.01)
*F21S 41/25* (2018.01)
*F21S 41/32* (2018.01)
(Continued)

(52) U.S. Cl.
CPC ........... *F21S 41/295* (2018.01); *F21S 41/147* (2018.01); *F21S 41/155* (2018.01); *F21S 41/25* (2018.01); *F21S 41/321* (2018.01); *F21S 41/36* (2018.01); *F21S 41/43* (2018.01); *G02B 19/0028* (2013.01); *G02B 19/0061* (2013.01); *F21S 41/365* (2018.01); *F21Y 2115/10* (2016.08); *F21Y 2115/30* (2016.08)

(58) Field of Classification Search
CPC ........ F21S 48/125; F21S 41/155; F21S 41/43; F21S 41/25
See application file for complete search history.

(56) References Cited

U.S. PATENT DOCUMENTS 2,171,640 A * 9/1939 Berek ....................... G02B 9/34
    359/778
2,887,566 A * 5/1959 Marks .................... F21S 48/114
    296/97.2
(Continued)

FOREIGN PATENT DOCUMENTS

CN          1955540 A     5/2007
CN          201706353 U   1/2011
(Continued)

OTHER PUBLICATIONS

Office Action issued in French Application No. 1656164, dated Aug. 1, 2018 (7 pages).
(Continued)

*Primary Examiner* — Sharon E Payne
(74) *Attorney, Agent, or Firm* — Osha Liang LLP

(57) ABSTRACT

A vehicle lamp includes a projection lens and a light source disposed at a rear of the projection lens. The vehicle lamp is configured to irradiate light from the light source through the projection lens to a front. The projection lens is configured by a plurality of lenses disposed on an optical axis extending in a vehicle longitudinal direction. A rear major surface of the projection lens is configured as a convex curved surface which has a curvature greater than a curvature of a spherical surface centered on a rear focal point of the projection lens.

5 Claims, 8 Drawing Sheets

(51) Int. Cl.
 F21S 41/36 (2018.01)
 F21S 41/43 (2018.01)
 *F21Y 115/10* (2016.01)
 *F21Y 115/30* (2016.01)
 *F21S 41/365* (2018.01)

(56) References Cited

U.S. PATENT DOCUMENTS

2007/0127253 A1   6/2007  Kawashima et al.
2010/0321782 A1  12/2010  Yasui

FOREIGN PATENT DOCUMENTS

| DE | 3505771 A1 | 8/1986 |
| DE | 102011004086 A1 | 8/2012 |
| EP | 0171646 A1 | 2/1986 |
| EP | 2306074 A2 | 4/2011 |
| EP | 2431658 A2 | 3/2012 |
| EP | 2690348 A2 | 1/2014 |
| JP | 2014-026741 A | 2/2014 |

OTHER PUBLICATIONS

Office Action issued Chinese Application No. 201610487337.9, dated May 4, 2018 (12 pages).

\* cited by examiner

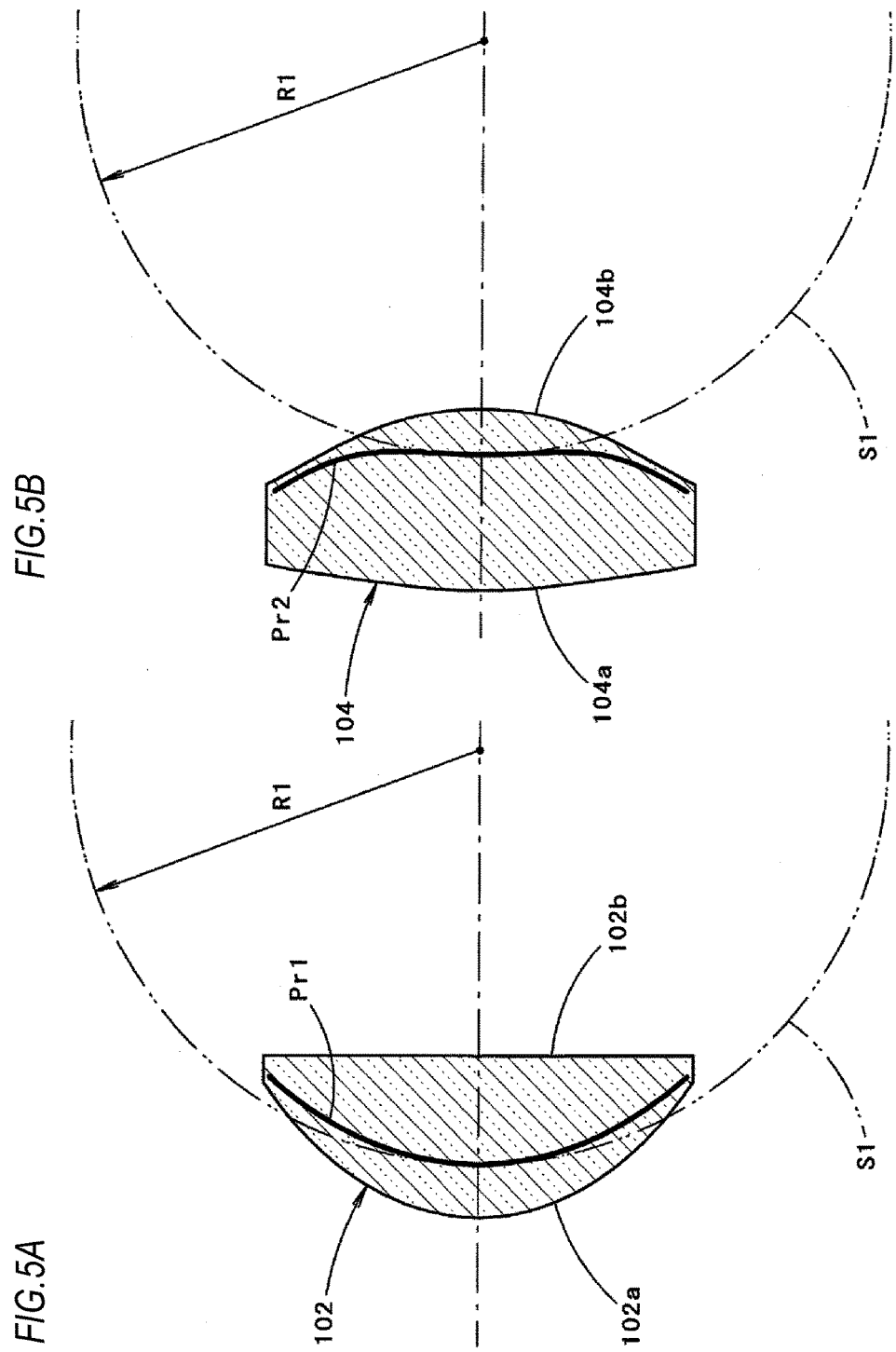

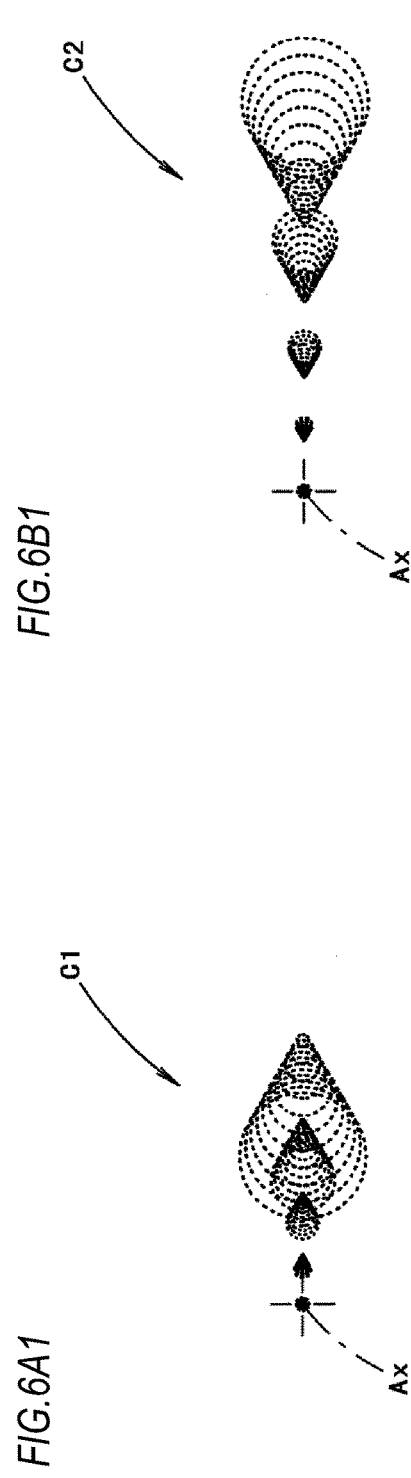
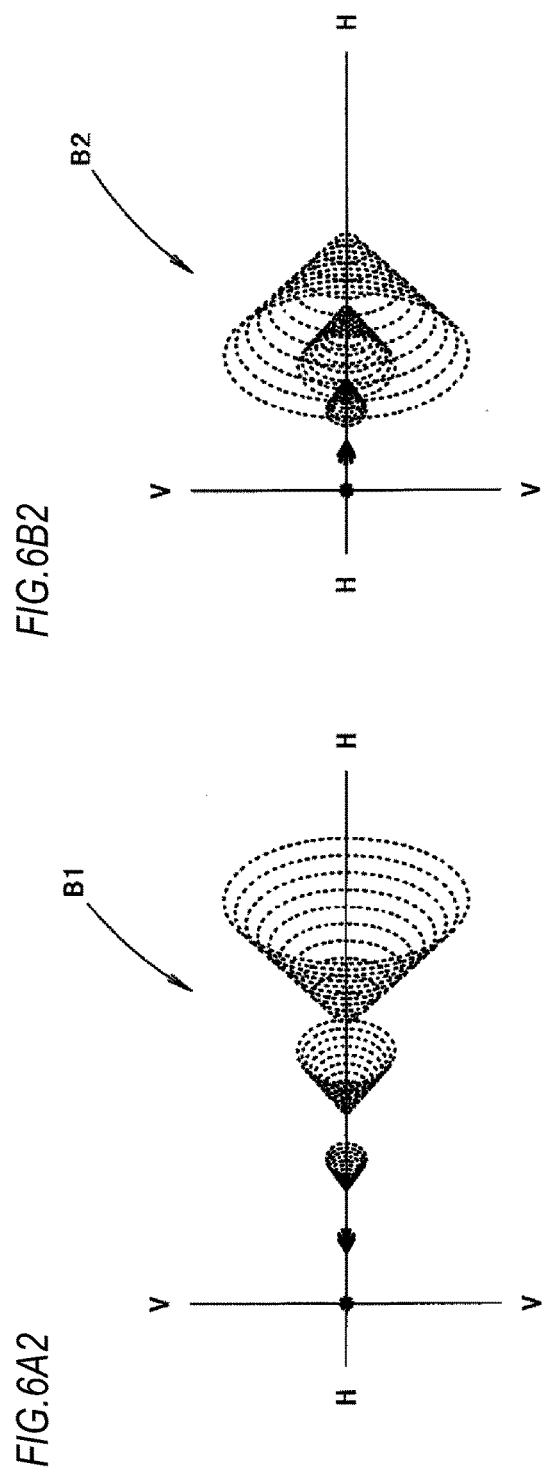
FIG.6A1  FIG.6B1
FIG.6A2  FIG.6B2

VEHICLE LAMP

CROSS-REFERENCE TO RELATED APPLICATION

This application claims priorities from Japanese Patent Application No. 2015-133972 filed on Jul. 2, 2015, the entire contents of which are incorporated herein by reference.

FIELD

The present invention relates to a projector-type vehicle lamp.

BACKGROUND

Conventionally, there has been known a projector-type vehicle lamp which is configured to irradiate light from a light source disposed at the rear of a projection lens through the projection lens to the front.

In a vehicle lamp disclosed in Patent Document 1, a projection lens is configured by two lenses disposed on an optical axis extending in a vehicle longitudinal direction.
Patent Document 1: Japanese Patent Laid-Open Publication No. 2014-26741

In a vehicle lamp such as a headlamp, it is desirable to form a light distribution pattern in which light unevenness is as small as possible, as a light distribution pattern to be formed by the light irradiated.

In a conventional projector-type vehicle lamp, a plano-convex aspherical lens whose front surface is configured as a convex curved surface is often used as a projection lens. However, a large coma aberration occurs in the projection lens having such a configuration. At that time, a tail of the coma in the coma aberration extends inwardly (i.e., toward an optical axis) in an optical image forming system where light is incident on the projection lens from the front.

On the other hand, when such a projection lens is used in an illumination optical system, blurring due to the coma aberration occurs. The blurring is formed in such a way that the tail of the coma extends toward the outside of a light distribution pattern. Therefore, a light distribution pattern to be formed by the light irradiated from a vehicle lamp having such a projection lens is formed such that an outer peripheral edge portion gradually becomes darker. As a result, the uniformity of the light distribution pattern can be enhanced.

By the way, when the projection lens is configured by a plurality of lenses, a thickness of each lens can be thinned. Therefore, it is possible to effectively suppress the occurrence of sink marks even when employing a resin lens or the like.

Even when the projection lens is configured by a plurality of lenses in this way, in order to enhance the uniformity of the light distribution pattern, it is desirable to form the light distribution pattern in which the blurring due to the coma aberration occurs in such a way that the tail of the coma extends toward the outside of the light distribution pattern.

SUMMARY

The present invention has been made in view of these situations and an object thereof is to provide a projector-type vehicle lamp capable of forming a highly uniform light distribution pattern even when a projection lens is configured by a plurality of lenses.

The present invention is intended to achieve the above object by devising the arrangement of a rear principal plane of a projection lens.

Specifically, a vehicle lamp according to the present invention includes a projection lens and a light source disposed at the rear of the projection lens. The vehicle lamp is configured to irradiate light from the light source through the projection lens to the front.

The projection lens is configured by a plurality of lenses disposed on an optical axis extending in a vehicle longitudinal direction.

A rear principal plane of the projection lens is configured as a convex curved surface which has a curvature greater than a curvature of a spherical surface centered on a rear focal point of the projection lens.

A specific configuration of the vehicle lamp according to the present invention is not particularly limited. For example, the vehicle lamp may employ a configuration that light from the light source is directly incident on the projection lens or a configuration that light from the light source is incident on the projection lens by being reflected in a reflector.

The type of the "light source" is not particularly limited. For example, a light emitting element such as a light emitting diode or a laser diode, or a light source bulb, or the like may be employed.

A specific configuration of each lens of the plurality of lenses constituting the "projection lens" is not particularly limited, so long as a rear principal plane of the projection lens is configured as a convex curved surface which has a curvature greater than that of a spherical surface centered on a rear focal point of the projection lens.

In the vehicle lamp according to the present invention, the projection lens is configured by a plurality of lenses disposed on the optical axis extending in the vehicle longitudinal direction. Therefore, a thickness of each lens can be thinned. In this way, it is possible to effectively suppress the occurrence of sink marks even when employing a resin lens or the like.

Then, in the present invention, the rear principal plane of the projection lens is configured as a convex curved surface which has a curvature greater than that of a spherical surface centered on the rear focal point of the projection lens. Therefore, the following effects can be obtained.

Specifically, when it is assumed that parallel light is incident on the projection lens from the front, a coma aberration occurs in an image forming plane and a tail of the coma in the coma aberration extends inwardly (toward the optical axis). On the other hand, blurring due to the coma aberration occurs in a light distribution pattern to be formed by the light emitted from the projection lens. The blurring is formed in such a way that the tail of the coma extends toward the outside of the light distribution pattern. Therefore, it is possible to form a highly uniform light distribution pattern where an outer peripheral edge portion gradually becomes darker.

In this way, the projector-type vehicle lamp according to the present invention is able to form a highly uniform light distribution pattern even when the projection lens is configured by a plurality of lenses.

In the above configuration, a front surface of the lens located at the foremost of the plurality of lenses may be configured in a convex curved surface where the curvature on the optical axis is set to a value within a range of 0.002 to 0.01 (1/mm). In this way, the following effects can be obtained.

Specifically, as compared with a projection lens configured by a single plano-convex aspherical lens as in the prior art, the curvature of the convex curved surface constituting the front surface of the projection lens can be significantly reduced and the front surface of the projection lens can be configured in the convex curved surface, instead of a simple flat surface. Therefore, the design of the projection lens can be improved when observing the vehicle lamp from the outside.

The lens located at the foremost may be formed in a biconvex lens shape. In this case, despite the fact that the curvature of the front surface of the lens located at the foremost is small, it is possible to easily recognize that the lens is not a simple transparent lens but a convex lens when observing the vehicle lamp from the outside. In this way, the design of the projection lens can be further improved.

In the above configuration, a light-reflection suppression processing may be performed on respective surfaces of a plurality of lenses other than the front surface of the lens located at the foremost and a rear surface of the lens located at the rearmost. In this case, even when the projection lens is configured by a plurality of lenses, it is possible to effectively suppress unexpected stray light from being generated when the light from the light source is transmitted through the projection lens.

The "light-reflection suppression processing" is not limited to a specific processing, so long as it is able to suppress the light reflection. For example, a processing for forming an anti-reflection film or a processing for forming microasperities may be employed.

In the above configuration, the plurality of lenses may be supported by a common cylindrical holder, and then, an opening may be formed in a peripheral surface portion of the cylindrical holder. In this case, a portion of the plurality of lenses can be made to be visible through the opening when observing the vehicle lamp from the outside. In this way, the design of the projection lens can be improved.

BRIEF DESCRIPTION OF DRAWINGS

FIG. 5A is a plan sectional view showing a projection lense as a comparative example of the projection lens.

FIG. 5B is a plan sectional view showing a projection lense as a comparative example of the projection lens.

FIG. 6A1 is a view schematically showing a coma aberration which occurs in the projection lens of the above embodiment and the projection lenses of the comparative example.

FIG. 6A2 is a view schematically showing a blurring of a light distribution pattern which occurs in the projection lens of the above embodiment and the projection lenses of the comparative example.

FIG. 6B1 is a view schematically showing a coma aberration which occurs in the projection lenses of the comparative example.

FIG. 6B2 is a view schematically showing a blurring of a light distribution pattern which occurs in the projection lenses of the comparative example.

DETAILED DESCRIPTION

Hereinafter, an embodiment of the present invention will be described with reference to the drawings.

Figure 1:
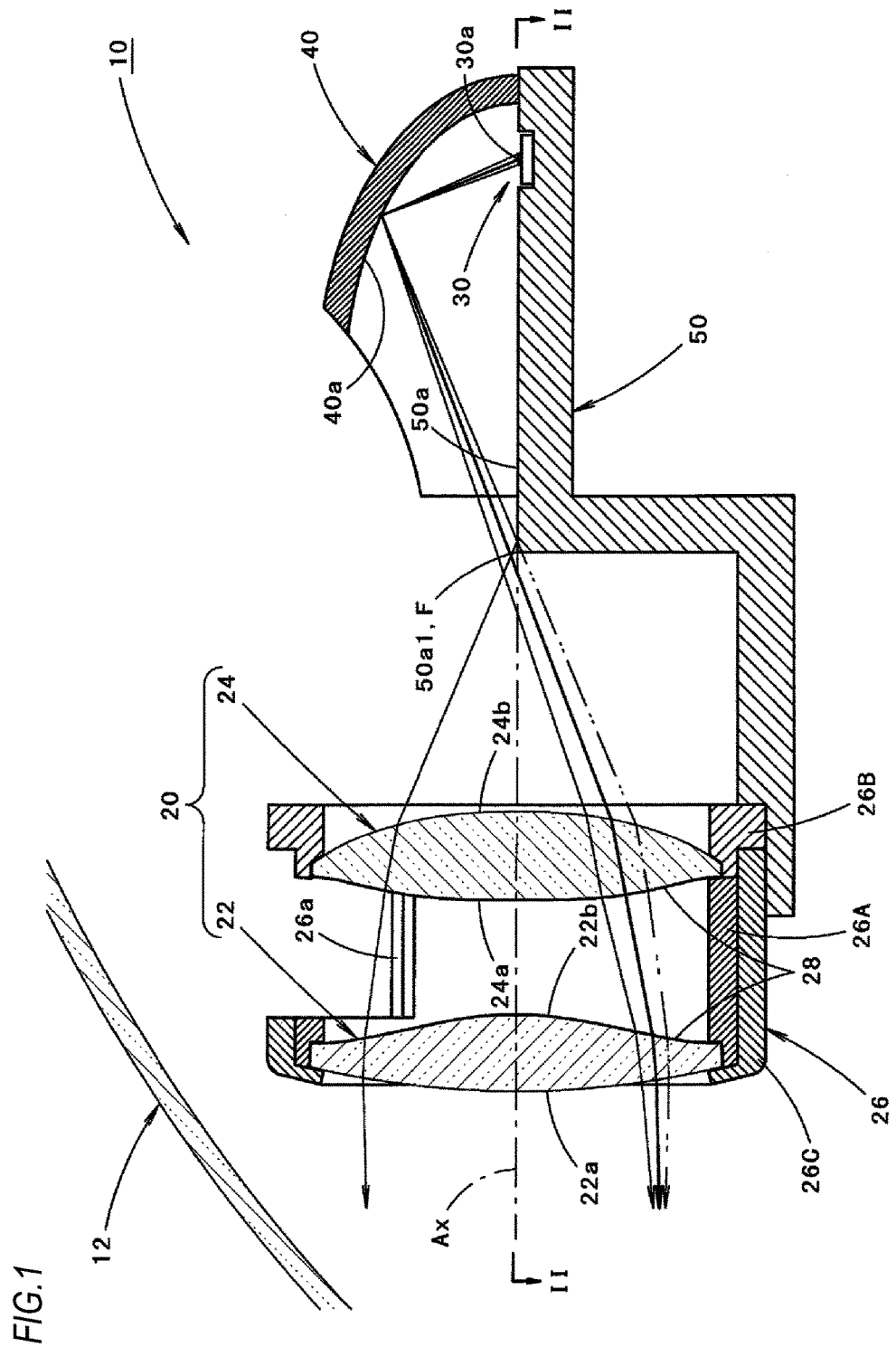
FIG. 1 is a side sectional view showing a vehicle lamp according to an embodiment of the present invention.

FIG. 1 is a side sectional view showing a vehicle lamp according to an embodiment of the present invention. In addition, FIG. 2 is a sectional view taken along a line II-II shown in FIG. 1.

Figure 2:
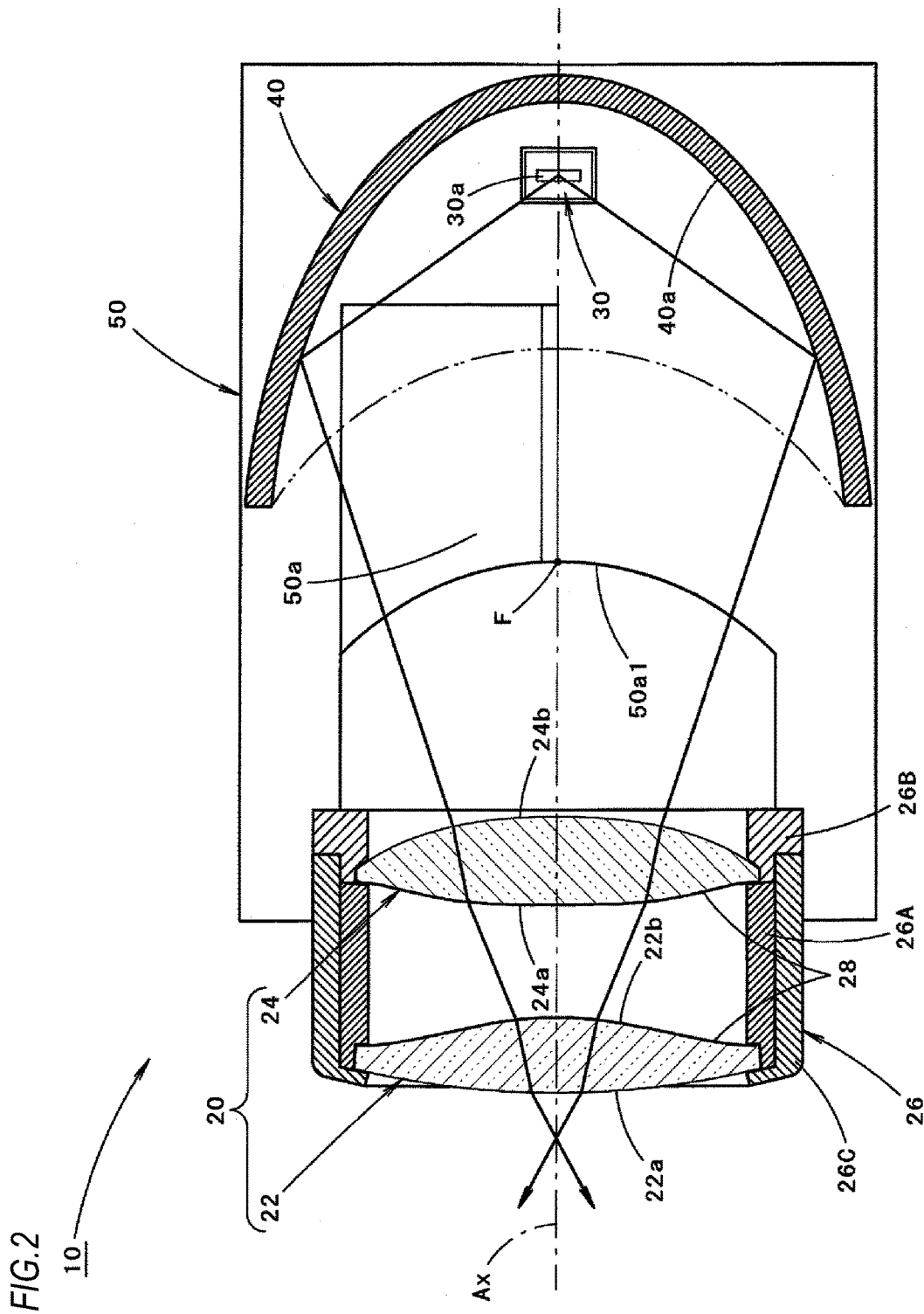
FIG. 2 is a sectional view taken along a line II-II shown in FIG. 1.

As shown in FIGS. 1 and 2, a vehicle lamp 10 according to the present embodiment is a low-beam headlamp provided in a front end portion of a vehicle. The vehicle lamp is configured as a projector-type lamp unit included in the interior of a lamp chamber. The lamp chamber is defined by a lamp body (not shown) and a plain-shaped translucent cover 12 attached to a front end opening of the lamp body.

Specifically, the vehicle lamp 10 has a configuration to include a projection lens 20 having an optical axis Ax extending in a vehicle longitudinal direction, a light emitting element 30 serving as a light source and disposed on the rear side of a rear focal point F of the projection lens 20, a reflector 40 disposed to cover the light emitting element 30 from above and configured to reflect the light from the light emitting element 30 toward the projection lens 20, and a base member 50 having an upward reflective surface 50a for reflecting upward a portion of the light reflected from the reflector 40.

Meanwhile, the vehicle lamp 10 is configured such that the optical axis Ax is slightly lower with respect to the vehicle longitudinal direction in a state where an optical axis adjustment is completed.

The projection lens 20 is configured by two lenses 22, 24 which are arranged on the optical axis Ax at a required interval in a longitudinal direction. These two lenses 22, 24 are configured such that outer peripheral edge portions thereof are supported by a common cylindrical holder 26. The cylindrical holder 26 is supported on the base member 50. Meanwhile, specific configurations of the projection lens 20 and the cylindrical holder 26 will be described below.

The light emitting element 30 is a white light emitting diode and has a light emitting surface 30a. The light emitting surface 30a has an oblong rectangular shape and extends in a vehicle width direction. Further, the light emitting element 30 is disposed in a state where the light emitting surface 30a faces upward on the optical axis Ax. The light emitting element 30 is supported on the base member 50.

A reflective surface 40a of the reflector 40 is configured in a substantially elliptical curved surface which has a long axis coaxial with the optical axis Ax and in which a light emission center of the light emitting element 30 is a first focal point of the reflective surface 40a. Eccentricity of the reflective surface 40a is set to be gradually increased from a vertical section toward a horizontal section. In this way, the reflector 40 is configured such that the light from the light emitting element 30 is converged to a point located slightly in front of the rear focal point F in the vertical section and the convergence position thereof is displaced considerably forward in the horizontal section. The reflector 40 is supported on the base member 50.

A mirror processing by aluminum deposition or the like is performed on an upper surface of the base member 50, thereby forming the upward reflective surface 50a of the base member 50. In the upward reflective surface 50a, a left region located on the left side (right side as seen from the vehicle front) of the optical axis Ax is configured as a horizontal plane having the optical axis Ax, and a right region located on the right side of the optical axis Ax is configured as a horizontal plane which is lower than the left region by one step via a short inclined surface. A front end edge 50a1 of the upward reflective surface 50a extends so as to be curved toward both left and right sides and toward the front side from the rear focal point F. Further, the upward reflective surface 50a is formed at an area within a range from the front end edge 50a1 to a position which is spaced apart at a predetermined distance rearward from the front end edge 50a1.

The base member 50 is configured such that a portion of the reflected light directed from the reflective surface 40a of the reflector 40 to the projection lens 20 is incident on the projection lens 20 by being reflected upward in the upward reflective surface 50a and then is emitted as downward light from the projection lens 20.

Next, specific configurations of the projection lens 20 and the cylindrical holder 26 are described.

Both of two lenses 22, 24 constituting the projection lens 20 are formed in a biconvex lens shape.

A front surface 22a of the lens 22 located on the front side is configured in a convex curved surface that approximates to a spherical surface having a large radius of curvature (which will be described below).

A rear surface 22b of the lens 22 is configured in a convex curved surface where the curvature of a central region in the vicinity of the optical axis Ax is greater than that of the front surface 22a. The curvature is gradually decreased toward an outer peripheral side from the central region and becomes substantially zero at an outer peripheral edge region.

On the other hand, a front surface 24a of the lens 24 located on the rear side is configured in such a way that a central region in the vicinity of the optical axis Ax is formed in a substantially planar shape, an outer peripheral side region of the central region is configured in a convex curved surface and the curvature becomes substantially zero again at an outer peripheral edge region.

A rear surface 24b of the lens 24 is configured in such a way that a central region in the vicinity of the optical axis Ax is configured in a convex curved surface having substantially the same curvature as the front surface 22a of the lens 22 and the curvature is gradually increased from the central region toward an outer peripheral side.

An anti-reflection film 28 is formed over the entire region of the rear surface 22b of the lens 22 and the front surface 24a of the lens 24.

The cylindrical holder 26 is configured by a first holder 26A for supporting the lens 22, a second holder 26B for supporting the lens 24 at the rear of the first holder 26A, and a third holder 26C attached to the first and second holders.

The first holder 26A is abutted against an outer peripheral surface of the lens 22 and an outer peripheral edge portion of the rear surface 22b of the lens 22 and is also abutted against an outer peripheral edge portion of the front surface 24a of the lens 24. Further, the second holder 26B is abutted against an outer peripheral surface of the lens 24 and an outer peripheral edge portion of the rear surface 24b of the lens 24. The third holder 26C is formed so as to cover the first holder 26A. A front end portion of the third holder 26C is abutted against an outer peripheral edge portion of the front surface 22a of the lens 22 and a rear end portion thereof is fixed to the second holder 26B.

An opening 26a is formed on an upper side of a peripheral surface portion of the cylindrical holder 26 between the lens 22 and the lens 24. The opening 26a is formed by the first and third holders 26A, 26 being partially cut out.

Figure 3:
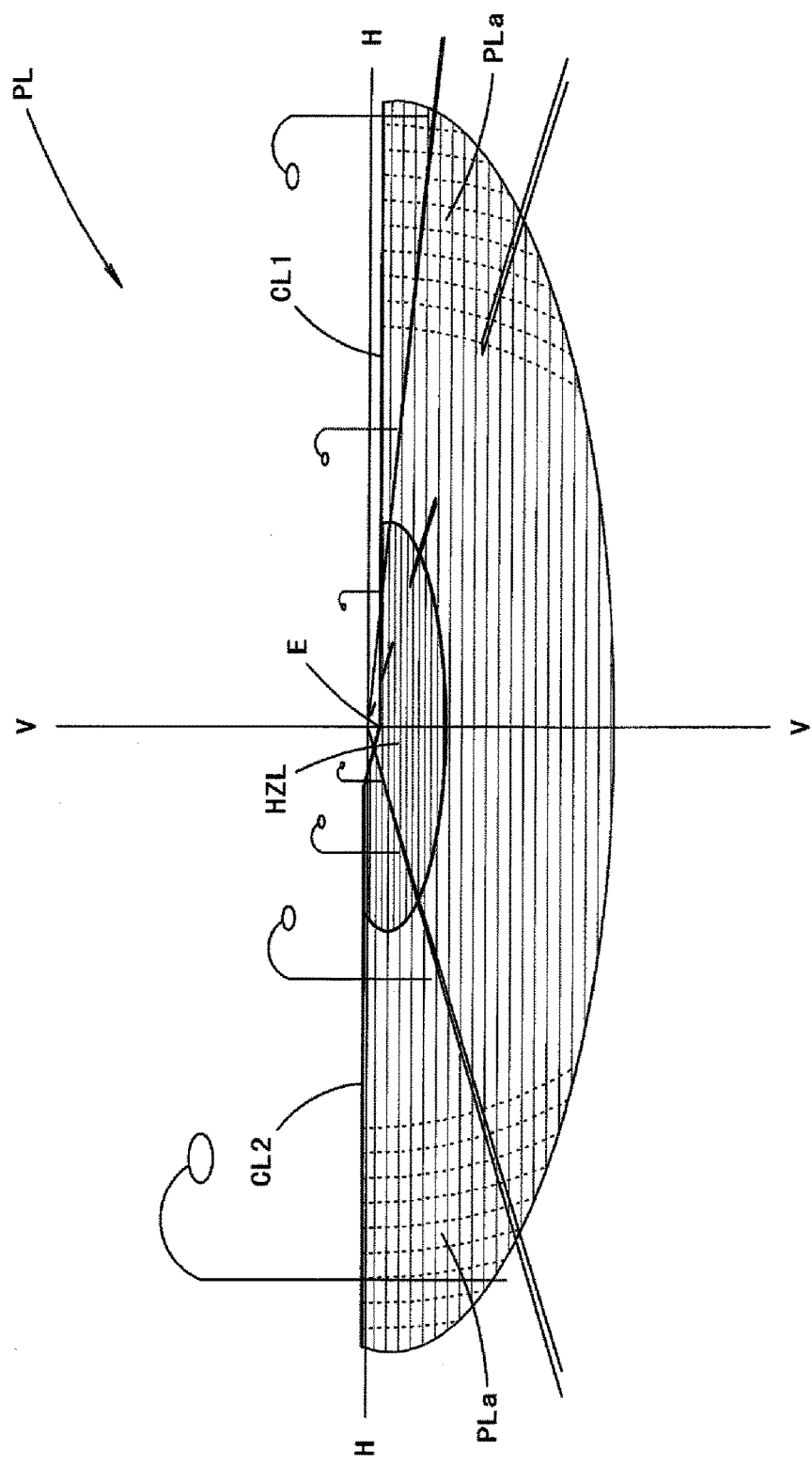
FIG. 3 is a view perspectively showing a low-beam light distribution pattern that is formed on a virtual vertical screen disposed at a position of 25 meters in front of the vehicle lamp by the light irradiated forward from the vehicle lamp.

FIG. 3 is a view perspectively showing a low-beam light distribution pattern PL that is formed on a virtual vertical screen disposed at a position of 25 meters in front of the vehicle by the light irradiated forward from the vehicle lamp 10.

The low-beam light distribution pattern PL is a low-beam light distribution pattern of a left light distribution and has, at an upper end edge thereof, cut-off lines CL1, CL2 having different left and right levels. The cut-off lines CL1, CL2 extend in a horizontal direction so as to have different left and right levels with a line V-V as a boundary. The line V-V vertically passes through an H-V that is a vanishing point in a lamp front direction. A right portion of the line V-V, which corresponds to an oncoming vehicle lane side, is formed as the lower cut-off line CL1. A left portion of the line V-V, which corresponds to an own vehicle lane side, is formed as the upper cut-off line CL2. Here, the upper cut-off line CL2 is raised in a step-by-step manner from the lower cut-off line CL1 to a higher level via a slope portion.

A light source image of the light emitting element 30 is formed on a rear focal plane of the projection lens 20 by the light which is emitted from the light emitting element 30 and reflected in the reflector 40. The light source image of the light emitting element 30 is projected as an inverted image on the virtual vertical screen by the projection lens 20. In this way, the low-beam light distribution pattern PL is formed. Further, the cut-off lines CL1, CL2 of the low-beam light distribution pattern PL are formed as an inverted projection image of the front end edge 50a1 of the upward reflective surface 50a of the base member 50.

In the low-beam light distribution pattern PL, an elbow point E that is an intersection point of the lower cut-off line CL1 and the line V-V is located downward from the H-V by about 0.5° to 0.6°. Further, a hot zone HZL that is a high luminous intensity region is formed approximately around the elbow point E.

The low-beam light distribution pattern PL is formed so that brightness is gradually decreased from the hot zone HZL toward an outer peripheral side. However, since the low-beam light distribution pattern PL is formed as the oblong light distribution pattern, a phenomenon that the brightness is gradually decreased especially at both left and right end portions PLa of the low-beam light distribution pattern PL has appeared remarkably. In this way, a large contrast is prevented beforehand from being formed in a road shoulder or a road surface in front of the vehicle. As a result, the uniformity of the light distribution pattern is improved and the visibility in front of the vehicle is sufficiently secured.

Hereinafter, the reason that the low-beam light distribution pattern PL is formed as a highly uniform light distribution pattern in this manner will be described.

Figure 4:
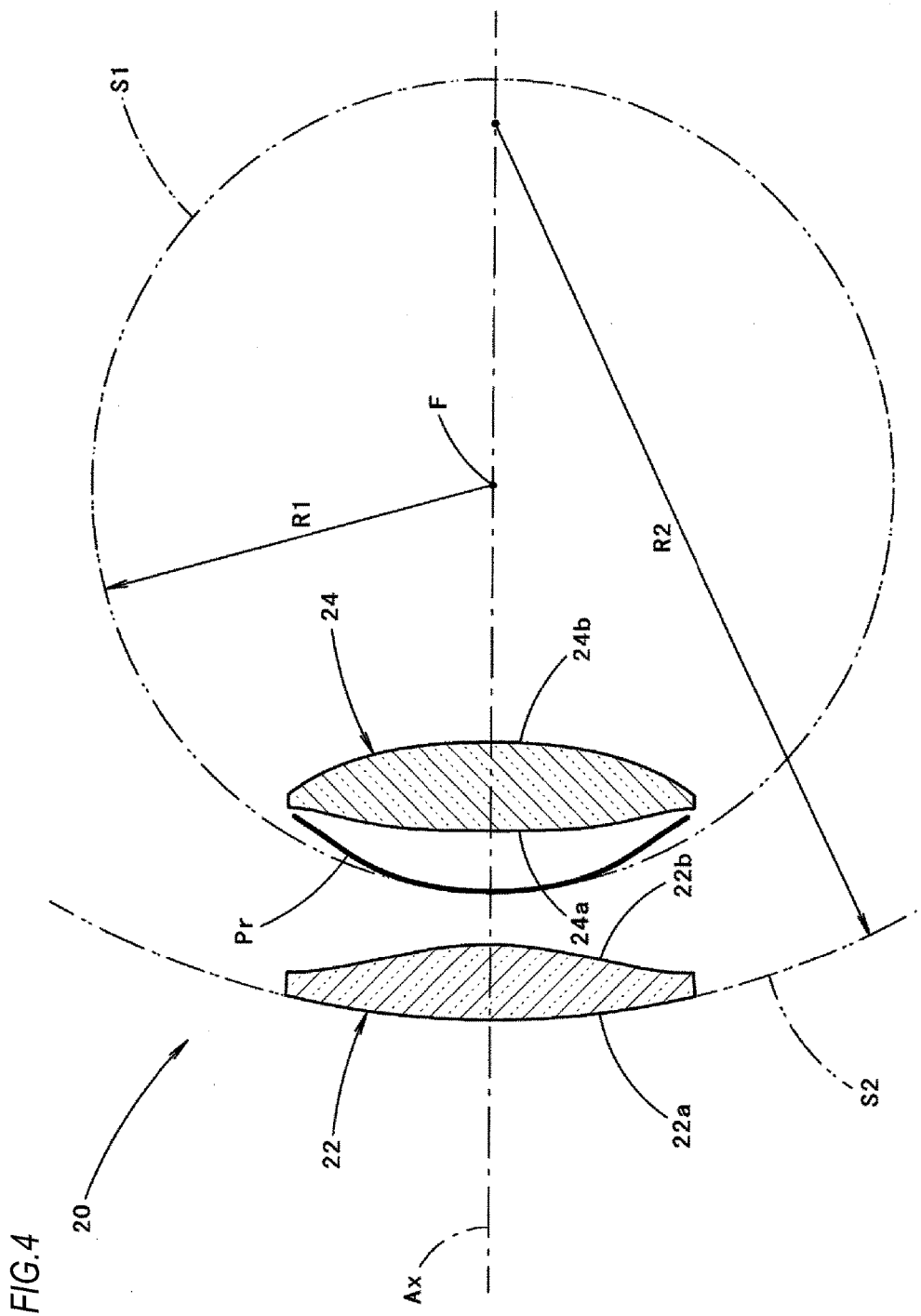
FIG. 4 is a plan sectional view separately showing a projection lens of the vehicle lamp.

FIG. 4 is a plan sectional view separately showing the projection lens 20.

As shown in FIG. 4, a rear principal plane Pr of the projection lens 20 is configured in a curved surface which is convex forward between the lens 22 and the lens 24. At that time, the rear principal plane Pr is configured in a convex curved surface which has a curvature greater than that of a spherical surface S1 centered on the rear focal point F of the projection lens 20. That is, the spherical surface S1 has a radius R1 equal to a focal length of the projection lens 20. The rear principal plane Pr is configured in a convex curved surface which is inscribed in the spherical surface S1 on the optical axis Ax.

The focal length of the projection lens 20 is set to a value of about 50 to 60 mm.

The front surface 22a of the lens 22 located on the front side is configured in a convex curved surface approximating to a spherical surface S2 whose radius R2 of curvature is set to 100 to 500 mm. Specifically, the convex curved surface constituting the front surface 22a has a curvature on the optical axis Ax, which is set to a value within a range of 0.002 to 0.01 (1/mm). That is, the curvature of the front surface 22a is set to a considerably small value which is equal to or less than ⅔ (equal to or less than ½ of the maximum curvature of the rear principal plane Pr) of the curvature of the spherical surface S1.

FIGS. 5A and 5B are plan sectional views showing two projection lenses 102, 104 as a comparative example of the projection lens 20 of the present embodiment.

Both of these two projection lenses 102, 104 are single lenses having the same focal length as the projection lens 20 of the present embodiment.

The projection lens 102 shown in FIG. 5A is a plano-convex aspherical lens which is often used as a projection lens of a conventional vehicle lamp. A front surface 102a of the projection lens 102 is configured in a convex curved surface and a rear surface 102b thereof is configured in a flat surface.

A rear principal plane Pr1 of the projection lens 102 is configured in a curved surface which is convex forward in the inside of the projection lens 102. In this case, similar to the rear principal plane Pr of the projection lens 20 of the present embodiment, the rear principal plane Pr1 is configured in a convex curved surface which has a curvature greater than that of the spherical surface S1 centered on the rear focal point F of the projection lens 102.

On the other hand, the projection lens 104 shown in FIG. 5B is a biconvex lens where a curvature of a front surface 104a is set to be substantially equal to that of the front surface 20a of the projection lens 20 of the present embodiment and a curvature of a rear surface 104b is set to a value much greater than that of the front surface 104a.

In the inside of the projection lens 104, a rear principal plane Pr2 of the projection lens 104 is configured in a curved surface which is convex forward in a region near the optical axis Ax but is varied to be convex rearward in an outer peripheral edge region.

FIG. 6 is a view schematically showing a relationship between a blurring of a light distribution pattern and a coma aberration which occurs in the projection lens 20 of the present embodiment and the projection lenses 102, 104 of the comparative example.

FIG. 6A1 is a view showing, in five light incidence angles, the coma aberration which occurs in the projection lens 20 of the present embodiment and the projection lens 102 of the comparative example. FIG. 6B1 is a view showing, in five light incidence angles, the coma aberration which occurs in the projection lens 104 of the comparative example.

As shown in FIG. 6A1, a coma aberration C1, which occurs in an image forming optical system where light is incident on the projection lenses 20, 102 from the front, is formed so that a tail of the coma extends inwardly (i.e., toward the optical axis Ax). The reason is that each of the rear principal planes Pr, Pr1 of the projection lenses 20, 102 is configured in a convex curved surface which has a curvature greater than that of the spherical surface S1 centered on the rear focal points of the projection lenses.

On the other hand, as shown in FIG. 6B1, a coma aberration C2, which occurs in an image forming optical system where light is incident on the projection lens 104 from the front, is formed so that a tail of the coma extends outwardly.

Further, as shown in FIG. 6A2, a blurring B1 due to the coma aberration occurs in a light distribution pattern formed by an illumination optical system where light is emitted forward from the projection lenses 20, 102. The blurring B1 is formed so that a tail of the coma extends toward the outside of the light distribution pattern.

On the other hand, as shown in FIG. 6B2, a blurring B2 due to the coma aberration also occurs in a light distribution pattern formed by an illumination optical system where light is emitted forward from the projection lens 104. The blurring B2 is formed so that a tail of the coma extends toward the inside of the light distribution pattern.

Therefore, the light distribution pattern formed by the light emitted from the projection lens 104 is formed such that an outer peripheral edge portion sharply becomes darker. On the contrary, the light distribution pattern formed by the light emitted from the projection lenses 20, 102 is formed such that the outer peripheral edge portion gradually becomes darker.

Next, effects of the present embodiment are described.

The vehicle lamp 10 according to the present embodiment has a configuration that the projection lens 20 is configured by two lenses 22, 24 disposed on the optical axis Ax extending in the vehicle longitudinal direction. Therefore, the thickness of each lens 22, 24 can be thinned. In this way, it is possible to effectively suppress the occurrence of sink marks even when employing a resin lens or the like as each lens 22, 24.

Furthermore, in the present embodiment, the rear principal plane Pr of the projection lens 20 is configured as a convex curved surface which has a curvature greater than that of the spherical surface S1 centered on the rear focal point F of the projection lens 20. Therefore, the following effects can be obtained.

Specifically, when it is assumed that parallel light is incident on the projection lens 20 from the front, the coma aberration C1 occurs in the image forming plane and the tail of the coma in the coma aberration C1 extends inwardly (toward the optical axis Ax). On the other hand, the blurring B1 due to the coma aberration occurs in a light distribution pattern to be formed by the light emitted from the projection lens 20. The blurring B1 is formed in such a way that the tail of the coma extends toward the outside of the light distribution pattern. Therefore, the low-beam light distribution pattern PL can be formed as a highly uniform light distribution pattern where an outer peripheral edge portion gradually becomes darker.

In this way, the projector-type vehicle lamp 10 according to the present embodiment is able to form a highly uniform light distribution pattern even when the projection lens 20 is configured by two lenses 22, 24.

At that time, the front surface 22a of the lens 22 located at the front of the two lenses 22, 24 is configured in a convex curved surface where the curvature on the optical axis Ax is set to a value within a range of 0.002 to 0.01 (1/mm). Therefore, the following effects can be obtained.

Specifically, as compared with the projection lens 102 configured by a single plano-convex aspherical lens as in the prior art, the curvature of the convex curved surface constituting the front surface 22a of the lens 22 can be significantly reduced and the front surface 22a can be configured in the convex curved surface, instead of a simple flat surface. Therefore, the design of the projection lens 20 can be improved when observing the vehicle lamp 10 from the outside.

At that time, the lens 22 is formed in a biconvex lens shape. Therefore, despite the fact that the curvature of the front surface 22a of the lens 22 is small, it is possible to easily recognize that the lens 22 is not a simple transparent lens but a convex lens when observing the vehicle lamp 10 from the outside. In this way, the design of the projection lens 20 can be further improved.

Further, in the present embodiment, a light-reflection suppression processing by an anti-reflection film may be performed on the rear surface 22b of the lens 22 and the front surface 24a of the lens 24. Therefore, despite the fact that the projection lens 20 is configured by two lenses 22, 24, it is possible to effectively suppress unexpected stray light from being generated when the light from the light emitting element 30 is transmitted through the projection lens 20.

Further, in the present embodiment, the two lenses 22, 24 are supported by the common cylindrical holder 26 and the opening 26a is formed on the upper side of the peripheral surface portion of the cylindrical holder 26 between the lens 22 and the lens 24. Therefore, the lens 24 located on the rear side of the opening 26a can be made to be visible through the opening 26a when observing the vehicle lamp 10 from the outside through the translucent cov6er 12. In this way, the design of the projection lens 20 can be improved.

In this case, the front surface 24a of the lens 24 is configured, similar to the lens 22, by a convex curved surface where a curvature on the optical axis Ax is small, and the rear surface 24b thereof is configured in a convex curved surface which has a curvature greater than that of the front surface 24a. Therefore, the design of the lens 24 seen through the opening 26a can be sufficiently improved.

In the above embodiment, the opening 26a is formed on the upper side of the peripheral surface portion of the cylindrical holder 26. However, the opening 26a may be formed on the side or the like of the peripheral surface portion of the cylindrical holder 26.

In the above embodiment, the projection lens 20 is configured by two lenses 22, 24. However, the projection lens 20 may be configured by three or more lenses.

In the above embodiment, the vehicle lamp 10 is configured as a headlamp for forming a low-beam light distribution pattern. The vehicle lamp 10 may be formed as a headlamp capable of switching between a high beam and a low beam or a fog lamp or the like.

Next, a modified example of the above embodiment is described.

Figure 7:
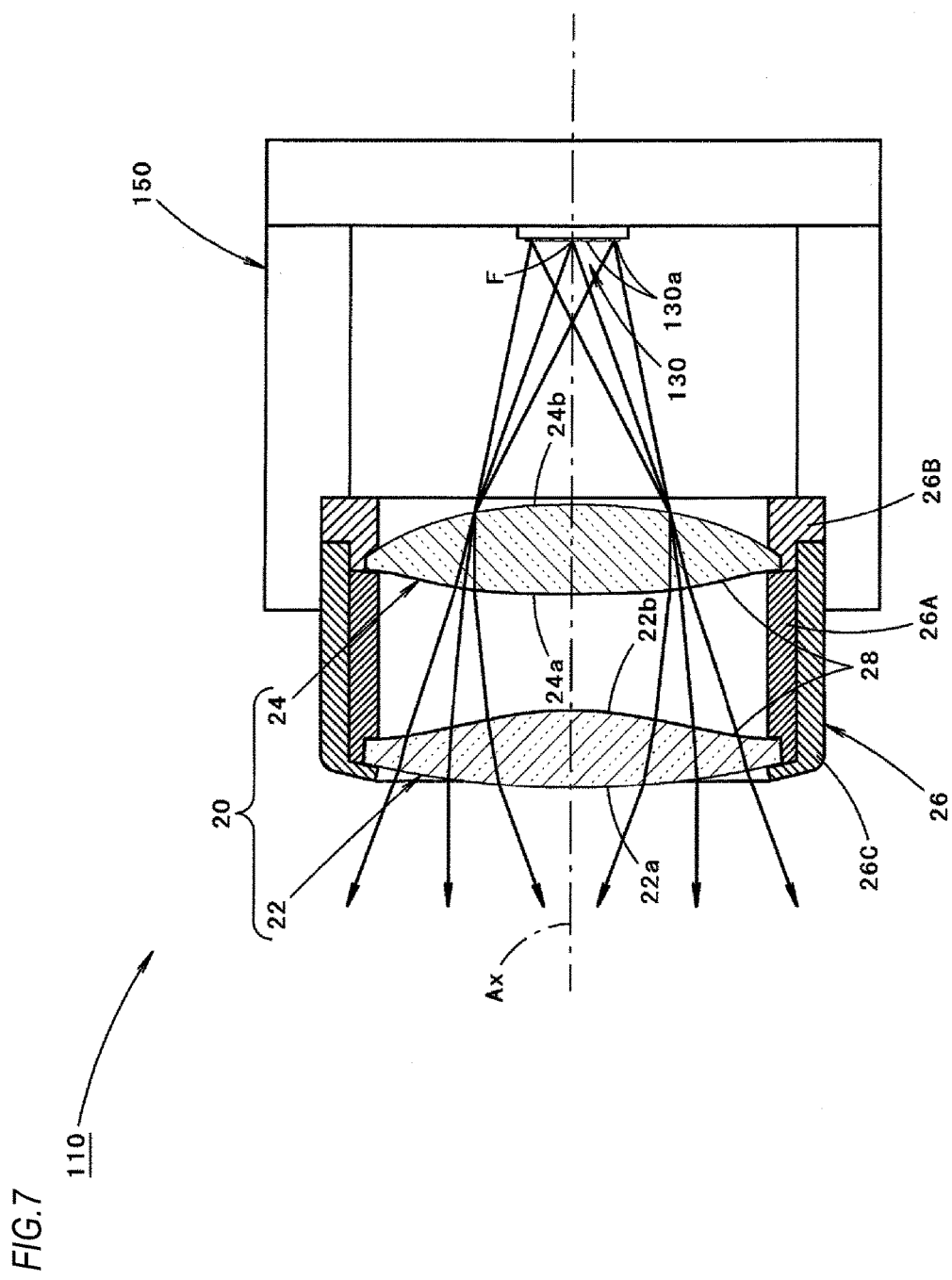
FIG. 7 is a view similar to FIG. 2, showing a modified example of the above embodiment.

FIG. 7 is a view similar to FIG. 2, showing a vehicle lamp 110 according to the present modified example.

As shown in FIG. 7, the vehicle lamp 110 is configured as a direct-projection type lamp unit.

Specifically, the vehicle lamp 110 includes the projection lens 20 and the cylindrical holder 26, similarly to the vehicle lamp of the above embodiment. However, the vehicle lamp 110 has a configuration that a light emitting element 130 as a light source is disposed at a position of the rear focal point F of the projection lens 20.

The light emitting element 130 is a white light emitting diode. The light emitting element 130 has a configuration that a plurality of (e.g., seven) rectangular light emitting surfaces 130a is arranged side by side in the vehicle width direction. Further, the light emitting element 130 is supported on a base member 150 in the state where the plurality of light emitting surfaces 130a faces forward. Meanwhile, the projection lens 20 is also supported on the base member 150 via the cylindrical holder 26.

Figure 8:
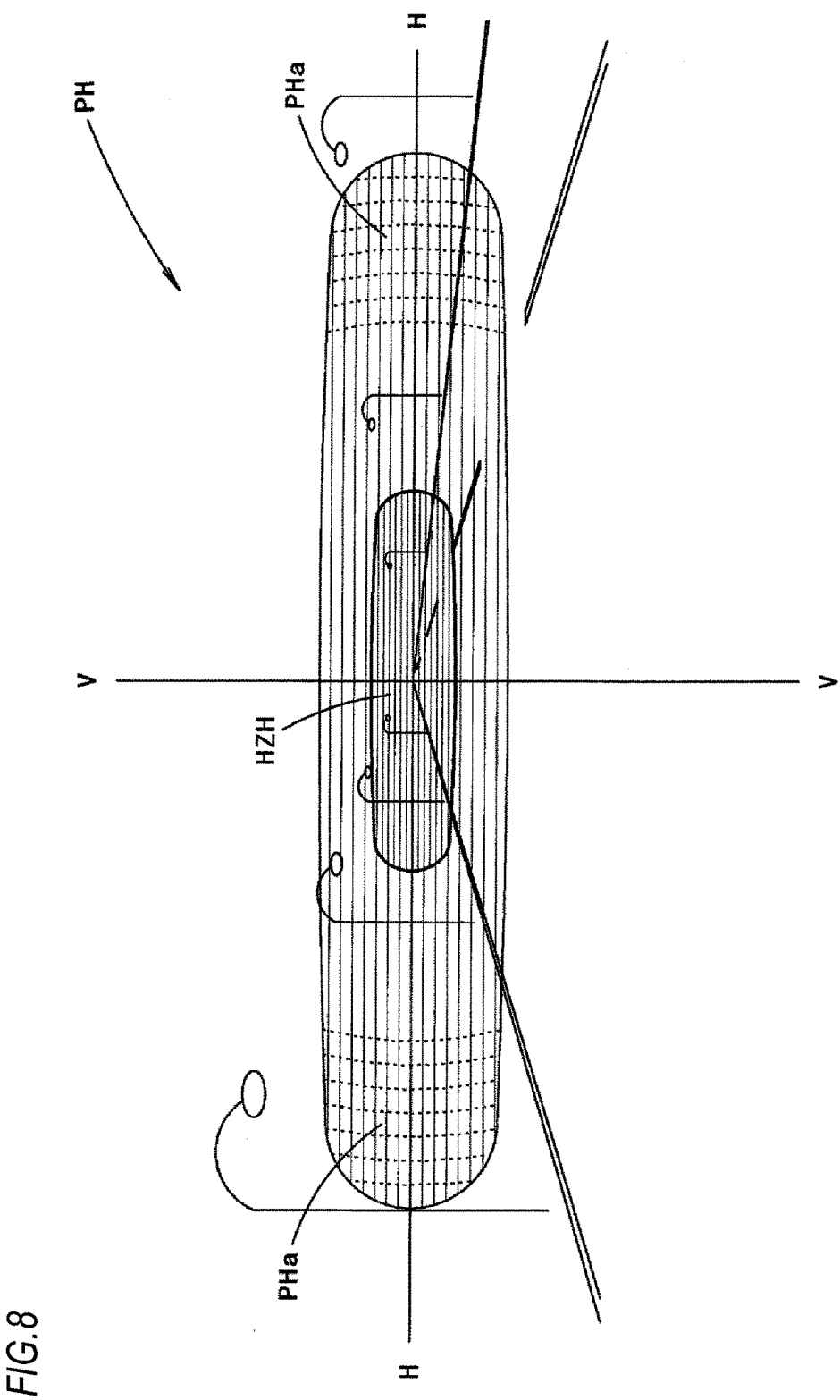
FIG. 8 is a view perspectively showing a high-beam light distribution pattern that is formed on the virtual vertical screen by the light irradiated forward from a vehicle lamp according to the modified example.

FIG. 8 is a view perspectively showing a high-beam light distribution pattern PH that is formed on the virtual vertical screen by the light irradiated forward from the vehicle lamp 110.

The high-beam light distribution pattern PH is formed as an oblong light distribution pattern extending in a lateral direction around the line V-V. A hot zone HZH is formed at the central portion of the high-beam light distribution pattern PH.

The high-beam light distribution pattern PH is formed so that brightness is gradually decreased from the hot zone HZH toward an outer peripheral side. However, since the high-beam light distribution pattern PH is formed as the oblong light distribution pattern, a phenomenon that the brightness is gradually decreased especially at both left and right end portions PHa of the high-beam light distribution pattern PH has appeared remarkably. In this way, a large contrast is prevented beforehand from being formed in a road shoulder or a road surface in front of the vehicle. As a result, the uniformity of the light distribution pattern is improved and the visibility in front of the vehicle is sufficiently secured.

The high-beam light distribution pattern PH is formed as a highly uniform light distribution pattern in this manner by the vehicle lamp 110 having the projection lens 20.

Also in the case of adopting the configurations of the present modified example, the same effects as the above embodiment can be obtained.

Of course, the numerical values represented as specifications in the above embodiments and modified examples thereof are merely examples and may be set to different values, as appropriate.

Further, the present invention is not limited to the configurations described in the above embodiments and modified examples thereof but may employ other configurations that are variously changed from the configurations.

The invention claimed is:

1. A vehicle lamp comprising:
   a projection lens; and
   a light source disposed at a rear of the projection lens,
   wherein the vehicle lamp is configured to irradiate light from the light source through the projection lens to a front,
   wherein the projection lens is configured by a plurality of lenses disposed on an optical axis extending in a vehicle longitudinal direction,
   wherein a rear principal plane of the projection lens is configured as a convex curved surface which has a curvature greater than a curvature of a spherical surface centered on a rear focal point of the projection lens, and
   wherein the rear principal plane of the projection lens is a surface formed by respective intersecting points of the projection lens, each of the intersecting points being where two lines, corresponding to a light ray entering the projection lens and the same light ray that is emitted from the projection lens, intersect.

2. The vehicle lamp according to claim 1,
   wherein a front surface of the lens located at the foremost of the plurality of lenses may be configured in a convex curved surface where the curvature on the optical axis is set to a value within a range of 0.002 to 0.01 (1/mm).

3. The vehicle lamp according to claim 2,
wherein the lens located at the foremost is formed in a biconvex lens shape.

4. The vehicle lamp according to claim 1,
wherein a light-reflection suppression processing is performed on respective surfaces of a plurality of lenses other than the front surface of the lens located at the foremost and a rear surface of the lens located at the rearmost.

5. The vehicle lamp according to claim 1,
wherein the plurality of lenses are supported by a common cylindrical holder, and
wherein an opening is formed in a peripheral surface portion of the cylindrical holder.

* * * * *